UNITED STATES PATENT OFFICE.

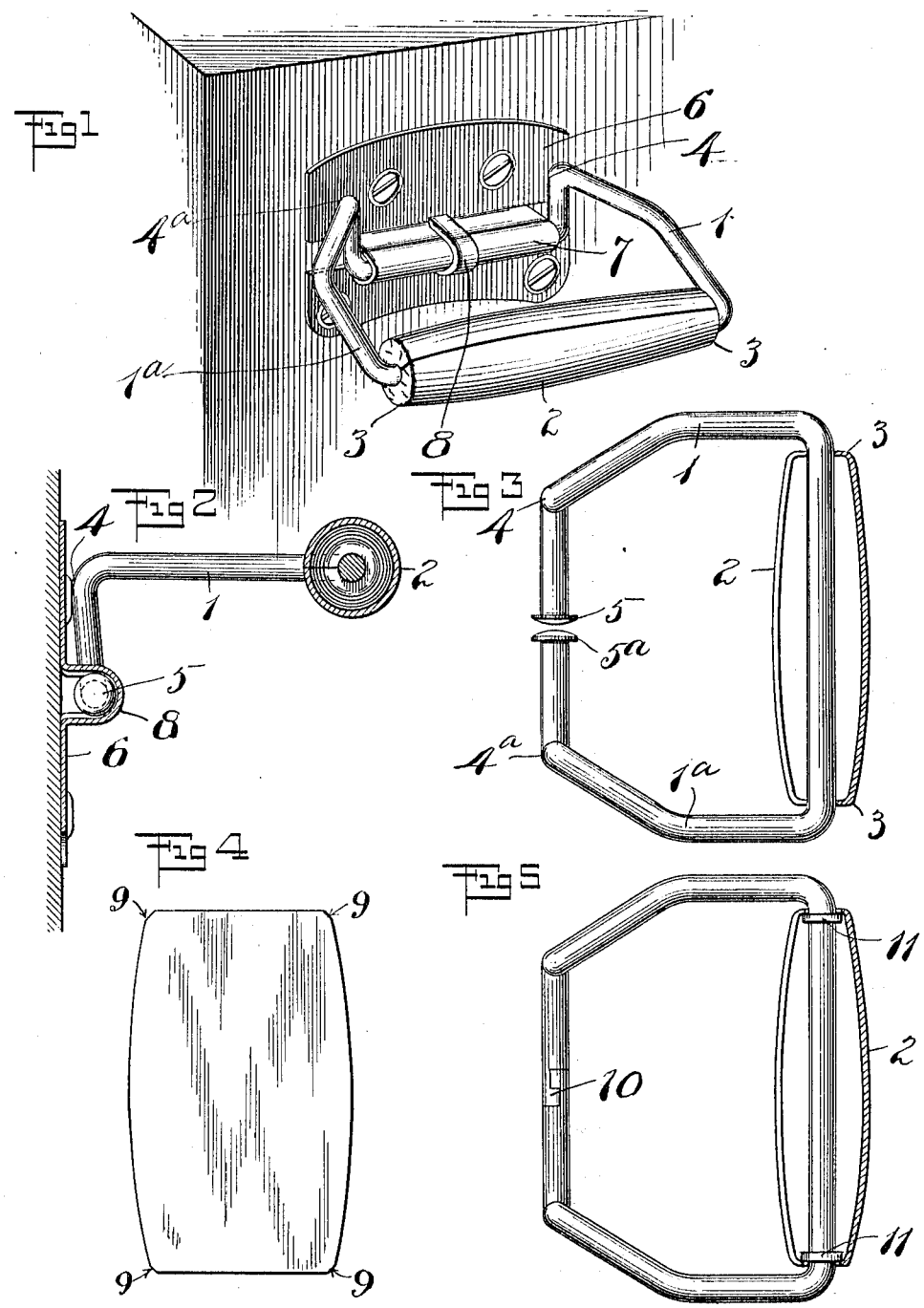

GEORGE P. HART AND STUART W. PARSONS, OF NEW BRITAIN, CONNECTICUT, ASSIGNORS TO THE STANLEY WORKS, OF NEW BRITAIN, CONNECTICUT, A CORPORATION OF CONNECTICUT.

HANDLE.

1,040,944.

Specification of Letters Patent.

Patented Oct. 8, 1912.

Application filed September 23, 1911. Serial No. 651,376.

*To all whom it may concern:*

Be it known that we, GEORGE P. HART and STUART W. PARSONS, citizens of the United States, residing at New Britain, county of Hartford, State of Connecticut, have invented certain new and useful Improvements in Handles, of which the following is a full, clear, and exact description.

Our invention relates to an improved handle construction, which handle may be used in a variety of connections, particularly for heavy bodies such as packing boxes, cases, refrigerators and the like.

In the drawings, Figure 1 is a perspective view of the handle complete and elevated to its operative position. Fig. 2 is a side elevation thereof, partly in section. Fig. 3 is a plan view of certain parts, likewise partly in section. Fig. 4 is a plan view of a blank from which the grip portion of the handle is made. Fig. 5 is a plan view partly in section, of a modification.

The main part of the handle comprises a wire bail portion, including the two side bars 1—1ª, said side bars being connected at one end. In the form shown in Figs. 1 to 3, the side bars are connected at one end adjacent to the grip portion 2 of the handle. The grip portion 2 is formed from sheet metal, rolled into cylindrical or barrel like form, the ends being turned in sharply to form an annular bearing 3—3, which is unbroken save at the point adjacent to the seam of the grip. The ends of the wire bail portion shown in Figs. 1 to 3 are first offset to form the stop shoulders 4—4ª and are then turned inwardly or toward each other, the extreme ends being preferably upset as at 5—5ª.

6 is an attaching plate. This plate may be of any suitable outline and at its middle portion is offset to form a bearing 7 for the bail portion of the handle. The middle portion of the bearing 7 is expanded at 8 to provide a space for the upset ends 5—5ª of the bail portion. The grip 2 is preferably formed from a blank of general rectangular form, such as shown in Fig. 4, the corners of which are clipped away slightly as shown at 9—9 so that when said blank is rolled into cylindrical or barrel-like form, the turned in ends will form a neat facing at each end of the grip. Were not the corners clipped away as described, the rolling of the blank into the desired form of the grip, and the turning in of the ends to form the annular bearings would bring the corners of the blank into such relation that said corners would be bulged out or in so as to not only produce an unsightly finish, but so as to resist the complete closing together of the edges of the blank.

In Fig. 5 we have shown a modification in which the ends of the bail portion are provided with an interlocking joint 10 instead of the enlargements 5—5ª. In the form shown in Fig. 5, said interlocking joint comprises an oppositely faced hooked portion at each end of the bail, said hooked portions mutually interlocking with one another to prevent the endwise separation of the parts. In Fig. 5 we have also shown a further improvement, which comprises providing stop washers or flanges 11—11 on the bail portion within the ends of the grip portion 2, said stop shoulders preventing any relative endwise movement of the bail within said grip portion. In the preferred form, the washer-like stop shoulders 11 are formed integrally with the metal of the bail, although obviously, in a broad sense, the integral formation of said shoulders is immaterial. By providing stop shoulders 11 within the ends of the bail, it will be found to be unnecesary to roll in the ends of the bail to such a degree as to cause the same to bear directly upon the bail portion at its smallest diameter. Again, should the pivotal part of the bail, namely that part within the bearing 7, be formed integrally or continuously, stop shoulders 11 would prevent the ends of the bail (then obviously within the grip 2) from being pulled apart. In this connection we desire to state that from a broad standpoint, it is immaterial to our invention whether the wire bail portion is separated at a point within the bearing 7 or within the grip 2. In operation it will be seen that the bail portion when in operative position stands as shown in Figs. 1 and 2, the stop shoulders 4—4 bearing against the upper part of the attaching plate 6. As soon as the grip portion 2 is released, it is obvious that the latter will drop or fold down by gravity to a position adjacent to the end of the box or case to which the attaching plate is secured.

It will be understood that we have described and illustrated only the preferred forms of our invention and that various changes and modifications may be made without departure from the spirit and scope thereof.

What we claim is:

In a handle of the character described, a wire bail portion, a grip portion secured thereto, said grip portion comprising a strip of sheet metal rolled into cylindrical form, an integral bearing and reinforcement at each end of said grip portion comprising an annular rolled in edge forming a contracted passage broken only in the line of the seam of said grip, said contracted passage corresponding substantially to the diameter of the wire bail portion, whereby said handle will take a bearing thereon.

GEORGE P. HART.
STUART W. PARSONS.

Witnesses:
A. W. AUSTIN,
W. E. DOANE.

Copies of this patent may be obtained for five cents each, by addressing the "Commissioner of Patents, Washington, D. C."